United States Patent [19]

Errington

[11] 4,071,311
[45] Jan. 31, 1978

[54] REFRACTORY INSULATION

[75] Inventor: Paul Anthony Errington, Neston, England

[73] Assignee: Morgan Refractories Limited, Wirral, England

[21] Appl. No.: 683,809

[22] Filed: May 6, 1976

[30] Foreign Application Priority Data

Feb. 12, 1976 United Kingdom ............... 5588/76

[51] Int. Cl.² .................... F27D 13/06; F27D 3/02
[52] U.S. Cl. .................................... 432/234; 138/149; 29/129
[58] Field of Search .............. 432/233, 234, 235, 248; 138/147, 148, 149; 29/129

[56] References Cited

U.S. PATENT DOCUMENTS

| 1,832,143 | 11/1931 | Sitton | 138/147 |
| 3,149,826 | 9/1964 | Brough et al. | 138/147 |
| 3,486,533 | 12/1969 | Doherty et al. | 138/147 |
| 3,781,167 | 12/1973 | Ahonen | 432/234 |
| 3,804,585 | 4/1974 | Twort | 432/234 |
| 3,914,100 | 10/1975 | Guskea | 432/233 |
| 3,946,763 | 3/1976 | Wilce | 138/147 |

FOREIGN PATENT DOCUMENTS 2,435,001  6/1975  Germany ..................... 432/234

Primary Examiner—John J. Camby
Assistant Examiner—Henry C. Yuen
Attorney, Agent, or Firm—Larson, Taylor and Hinds

[57] ABSTRACT

A metal tubular supporting member in a furnace sheathed by a refractory sheathing comprising refractory tiles held in place by metal coupling links covered and positively engaged by adjacent tiles so that tiles and links respectively clasp together and embrace around the furnace member.

3 Claims, 7 Drawing Figures

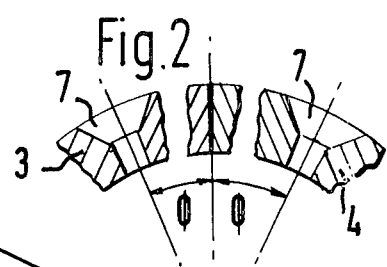
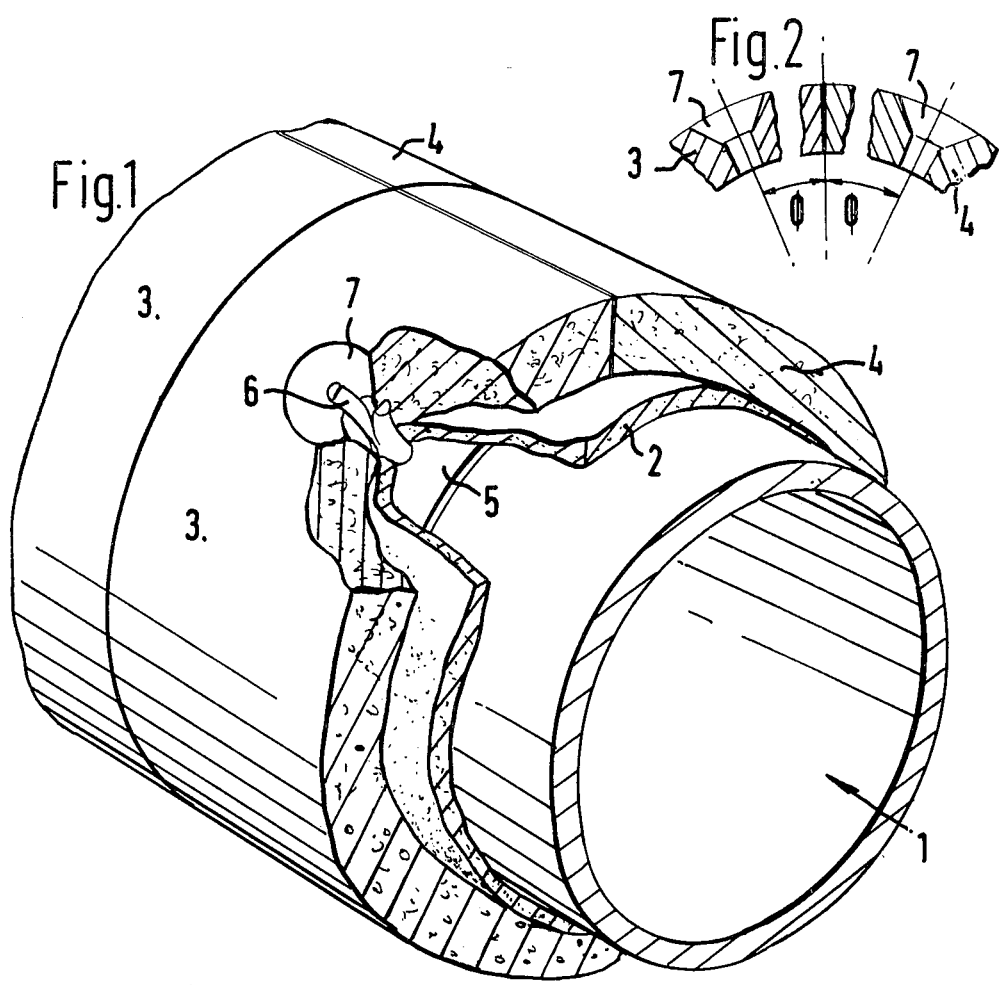
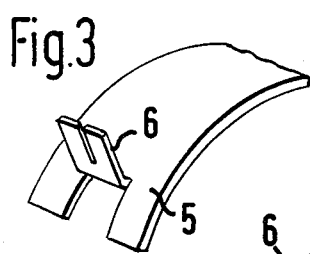
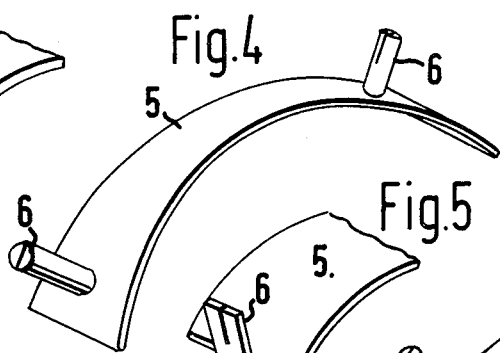
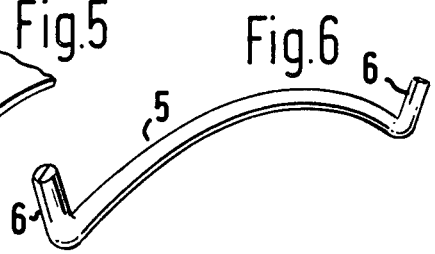
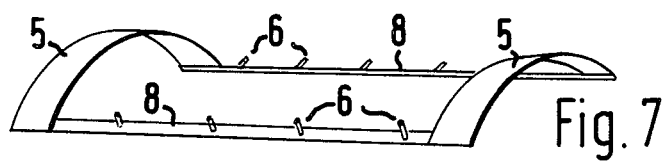

REFRACTORY INSULATION

This invention relates to refractory insulation for furnace members made of metal and sheathed with refractory materials, in particular horizontal pipes of water-cooled supporting structures for stock under treatment in a furnace.

The invention is especially suitable for cross-over pipes which support the rails along which stock is moved in reheat furnaces for ferrous slabs and will be described as applied thereto but application of the invention to tubular supporting rails themselves and to other members in furnaces where similar conditions exist is not precluded.

In a reheat furnace, slabs must be heated to a very high temperature, for example 1260° C, as uniformly as possible and the slabs are therefore moved, by pushers or walking beams, along raised skid rails, usually water-cooled hollow rails supported by a structure, like a gantry, of water-cooled hollow members while they are heated from above and below by intensely hot gas blast from burners.

The supporting structure is directly in the path of the hot gas and, as well as being water-cooled, the hollow rails and supports are sheathed with refractory material.

The present invention, in its preferred embodiment, provides a furnace member with improved sheathing consisting of an inner resilient layer of refractory fibrous material and an outer layer of refractory tiles held in place by metal coupling links which are covered and positively engaged by adjacent tiles so that tiles and links clasp together to embrace and thus hold in place around the furnace member.

An important feature of the invention is the provision of coupling links which are saddle-shaped, to rest on a furnace pipe, and have simple outward projections, such as pins or lugs, to engage through or in corresponding holes or sockets in tiles which meet in substantial abutment over the saddle-shaped links.

The invention provides the important technical advantage that the tiles are positively held in place, by their embracing engagement with the links, and are also cushioned and damped, against the loosening effects of vibration, by the resilient inner layer of fibrous material. Consequently the sheath as a whole is securely held in place but is cushioned against the effects of vibration and shock.

Preferably, for a tubular support such as a cross-over pipe, the tiles are segments of a circular cylinder or any other tubular or annular shape, of any suitable continuous or polygonal cross-sectional outline. The invention is for example suitable for a tubular member of substantially triangular cross-section.

Annular sets of two, three or more tiles, corresponding to the outline or sides of the cross-section of a required sheath, can be assembled, with one or more coupling links as required, as ring-sets around the inner layer of fibrous material, as many ring-sets being arranged in series along the rail or pipe as are required to cover its length. Tiles of adjacent ring-sets may be arranged in interfitting or staggered relationship.

The joints between adjacent tiles in a ring-set, or between adjacent sets, may be simply butt-joints or of shouldered or other overlapping form.

As mentioned above, the links may be saddle-shaped and in particular may each consist of an arcuate metal band, strap or bar the ends of which are provided with or bent to form substantially radial projections, in the form of pins, lugs, studs or prongs, to engage through matching holes provided at such angular location in the tiles that, when two tiles are butted together over the saddle, holes are presented at the same angular interval as the projections from the saddle so as to engage therewith. The tiles holes in which the projections engage are preferably countersunk on the outer side and filled with mortar when the sheath is installed.

Coupling links as described above in themselves constitute a feature of the invenion which therefore includes within its scope such a coupling link device, for locating, and holding against displacement, refractory tiles or other insulating sheath components on a horizontal pipe member in a furnace, each device comprising a saddle to rest on the pipe and having projections to extend substantially radially from the pipe to engage, as locating spigots, in holes or sockets therefor in the tiles.

As indicated above, in a preferred arrangement the refractory insulation includes an inner layer of fibrous refractory material which, on installation of a sheath, is placed over the saddle and pressed down so that the projections pierce through the fibrous layer which thereby holds the saddle in place until the tiles are placed over the fibrous layer and engaged with the projections.

The invention is illustrated by way of example on the accompanying drawing, in which:

FIG. 1 is a perspective view of a section of a cross-over pipe with a refractory sheath according to the invention, FIG. 2 is a fragmentary section to illustrate the angular location and form of tile holes, and FIGS. 3 to 7 are perspective detail views of alternative forms of coupling links.

As shown by FIG. 1, a water-cooled metal pipe 1 has a refractory insulating sheath made up by an inner layer 2 of refractory fibrous material and an outer layer consisting of pairs of semi-cylindrical refractory tiles 3 and 4.

To hold each pair of tiles in place, a saddle-shaped coupling link 5 of metal is placed, on installation of the sheath, to rest directly on the pipe 1 and is first held in place by the inner fibrous layer 2 which is wrapped, like a blanket, around the pipe.

The link 5 has a pair of projections 6, in the form of bifurcated studs or lugs, which are set apart at an angle which is twice the angle between one end of each tile and a hole 7 therein. Thus, a pair of tiles butted together over the pipe present their holes 7 to match the projections 6 and engage therewith.

As indicated in FIG. 1 the bifurcated ends of the projections are spread and the countersunk holes are then filled, e.g. with mortar or a plastic refractory material, with or without an inner fibre filling or lining faced with the mortar or plastic refractory.

As shown by FIGS. 3 to 6, the saddle-shaped coupling links may have various forms. FIGS. 3 to 5 show sheet metal straps with either studs 6 set in (FIG. 4) or lugs struck from the sheet material. FIG. 6 shows a bar link with its ends turned up to form lugs.

The coupling links may have two or more pins or other projections at each end, to engage with one or more tiles with multiple or single holes. FIG. 7 is an illustration of a multiple coupling link with terminal saddle straps 5 joined by side bars 8 in which studs 6 are set.

Instead of bifurcated pins, plain pins could be used and in such case the holes need not be countersunk and could be blind holes, or recesses, not opening through to the outer surface of the tiles.

On installation in a furnace, the coupling links could be held in place, prior to wrapping with fibre and attachment of the tiles, by setting them in cement on the pipe. An air-setting cement, preferably of high thermal conductivity, would be suitable. Such cementing of the coupling links in place facilitates initial location and avoids subsequent displacement.

The simple semi-cylindrical tiles shown in FIG. 1 are only for the purposes of illustration, other forms of tiles could be used and in particular pairs of interengaging tiles as described in our U.K. patent application no. 21104/73.

Although the invention has been described as applied to saddle-shaped coupling links, to rest on the top of a pipe, the same principles could be applied to links designed to clasp around the lower half of a pipe. Such links could be of an angular extent of more than 180°, and designed to be bent around or to spring on to a pipe, and present upward projections to be engaged by holes in tiles in a similar way to that shown for saddle links.

Links which clasp around the under-side of a pipe could be used for holding tiles in place on skid rails, the upper ends of each pair of tiles extending up to the sides of the skid rail bar or rib instead of the tile ends meeting.

I claim:

1. A furnace member comprising a generally horizontal metal pipe in a furnace and insulated by refractory sheathing consisting of metal coupling links which each rest on and fit around an upper part of the pipe, each link having substantially radially outwardly extending tile-engaging projections spaced apart around the coupling link, an inner resilient layer of refractory fibrous material covering the coupling links except for the tile-engaging projections which project through the inner layer, and an outer layer of refractory tiles which extend around and cover the inner layer, circumferentially adjacent tiles substantially meeting in abutment overlapping each coupling link and having holes engaged by said projections such that each link joins together two adjacent tiles, so that said tiles and links, with the inner layer interposed, positively interengage so as to embrace and hold in place around the pipe.

2. A furnace member according to claim 1, in which said coupling links are saddle-shaped metal bands and said projections are substantially radial pins which extend into countersunk holes in the tiles, the holes being filed with refractory material.

3. A furnace member according to claim 1 in which said coupling links each comprise a longitudinally-spaced pair of saddle-shaped members interconnected by longitudinal side bars and projections from said side bars engage sockets in pairs of refractory tiles meeting in substantial abutment over and covering said links.

* * * * *